United States Patent
Lawlor et al.

(10) Patent No.: US 7,434,400 B2
(45) Date of Patent: Oct. 14, 2008

(54) GAS TURBINE POWER PLANT WITH SUPERSONIC SHOCK COMPRESSION RAMPS

(76) Inventors: Shawn P. Lawlor, 3022 - 137th Ave. NE., Bellevue, WA (US) 98005; Mark A. Novaresi, 12071 - Cassini Ct., San Diego, CA (US) 92131; Charles C. Cornelius, 735 first St. South, #202, Kirkland, WA (US) 98033

( * ) Notice: Subject to any disclaimer, the term of this patent is extended or adjusted under 35 U.S.C. 154(b) by 763 days.

(21) Appl. No.: 11/102,937

(22) Filed: Mar. 30, 2005

(65) Prior Publication Data

US 2006/0021353 A1 Feb. 2, 2006

Related U.S. Application Data

(63) Continuation-in-part of application No. 10/672,358, filed on Sep. 25, 2003, now abandoned.

(60) Provisional application No. 60/414,796, filed on Sep. 26, 2002.

(51) Int. Cl.
*F02C 1/00* (2006.01)
*F02G 3/00* (2006.01)
(52) U.S. Cl. .......................... 60/726; 60/772
(58) Field of Classification Search ................ 60/772, 60/726, 805; 415/181
See application file for complete search history.

(56) References Cited

U.S. PATENT DOCUMENTS

| 2,435,236 A | 2/1948 | Redding |
| 2,570,081 A | 10/1951 | Szczeniowski |
| 2,579,049 A | 12/1951 | Price |
| 2,623,688 A | 12/1952 | Davidson |
| 2,628,768 A | 2/1953 | Kantrowitz |
| 2,648,493 A | 8/1953 | Stalker |
| 2,659,528 A | 11/1953 | Price |

(Continued)

FOREIGN PATENT DOCUMENTS

EP 0375198 A2 6/1990

(Continued)

OTHER PUBLICATIONS

Mayekawa Mfg. Co., Patent Abstracts of Japan, Publication No. 11351191A, Application No. 10155771, Application Date: Dec. 21, 1999; High Pressure Generating Method and Compressor Using This Method (in English language) (3 pages).

(Continued)

*Primary Examiner*—William H Rodriguez
(74) *Attorney, Agent, or Firm*—R. Reams Goodloe, Jr.

(57) ABSTRACT

A gas turbine engine. The engine is based on the use of a gas turbine driven rotor having a compression ramp traveling at a local supersonic inlet velocity (based on the combination of inlet gas velocity and tangential speed of the ramp) which compresses inlet gas against a stationary sidewall. The supersonic compressor efficiently achieves high compression ratios while utilizing a compact, stabilized gasdynamic flow path. Operated at supersonic speeds, the inlet stabilizes an oblique/normal shock system in the gasdynamic flow path formed between the rim of the rotor, the strakes, and a stationary external housing. Part load efficiency is enhanced by use of a lean pre-mix system, a pre-swirl compressor, and a bypass stream to bleed a portion of the gas after passing through the pre-swirl compressor to the combustion gas outlet. Use of a stationary low NOx combustor provides excellent emissions results.

77 Claims, 7 Drawing Sheets

U.S. PATENT DOCUMENTS

| | | | |
|---|---|---|---|
| 2,689,681 A | 9/1954 | Sabatiuk | |
| 2,710,136 A | 6/1955 | De Ganahl et al. | |
| 2,721,693 A | 10/1955 | Fabri et al. | |
| 2,749,027 A | 6/1956 | Stalker | |
| 2,763,426 A | 9/1956 | Erwin | |
| 2,792,983 A | 5/1957 | Stalker | |
| 2,797,858 A | 7/1957 | Von Der Nuell | |
| 2,805,818 A | 9/1957 | Ferri | |
| 2,806,645 A | 9/1957 | Stalker | |
| 2,819,837 A | 1/1958 | Loeb | |
| 2,830,753 A | 4/1958 | Stalker | |
| 2,834,573 A | 5/1958 | Stalker | |
| 2,839,239 A | 6/1958 | Stalker | |
| 2,841,325 A | 7/1958 | Weise | |
| 2,853,227 A | 9/1958 | Beardsley | |
| 2,918,254 A | 12/1959 | Hausammann | |
| 2,934,259 A | 4/1960 | Hausmann | |
| 2,935,246 A | 5/1960 | Roy | |
| 2,943,839 A | 7/1960 | Birmann | |
| 2,944,786 A | 7/1960 | Angell et al. | |
| 2,947,139 A | 8/1960 | Hausmann | |
| 2,949,224 A | 8/1960 | Pavlecka | |
| 2,953,295 A | 9/1960 | Stalker | |
| 2,955,747 A | 10/1960 | Schwaar | |
| 2,956,732 A | 10/1960 | Stalker | |
| 2,966,028 A | 12/1960 | Johnson et al. | |
| 2,967,013 A | 1/1961 | Dallenbach et al. | |
| 2,970,750 A | 2/1961 | Swearingen | |
| 2,974,857 A | 3/1961 | Schwaar | |
| 2,974,858 A | 3/1961 | Koffel et al. | |
| 2,974,927 A | 3/1961 | Johnson | |
| 2,989,843 A | 6/1961 | Ferri | |
| 2,991,929 A | 7/1961 | Stalker | |
| 3,001,364 A | 9/1961 | Woodworth | |
| 3,010,642 A | 11/1961 | Dickmann et al. | |
| 3,054,255 A | 9/1962 | Stratford | |
| 3,088,279 A | 5/1963 | Diedrich | |
| 3,118,277 A | 1/1964 | Wormser | |
| 3,145,915 A | 8/1964 | Marchal et al. | |
| 3,156,407 A | 11/1964 | Bourquard | |
| 3,184,152 A | 5/1965 | Bourquard | |
| 3,269,120 A | 8/1966 | Sabatiuk | |
| 3,356,289 A | 12/1967 | Plotkowiak | |
| 3,422,625 A | 1/1969 | Harris | |
| 3,442,441 A | 5/1969 | Dettmering | |
| 3,447,740 A | 6/1969 | Fabri et al. | |
| 3,524,458 A | 8/1970 | Goldsmith | |
| 3,541,790 A | 11/1970 | Kellett | |
| 3,588,270 A | 6/1971 | Boelcs | |
| 3,658,437 A | 4/1972 | Soo | |
| 3,692,425 A | 9/1972 | Erwin | |
| 3,719,426 A | 3/1973 | Friberg | |
| 3,724,968 A | 4/1973 | Friberg et al. | |
| 3,765,792 A | 10/1973 | Exley | |
| 3,771,925 A | 11/1973 | Friberg et al. | |
| 3,824,029 A | 7/1974 | Fabri et al. | |
| 3,873,229 A | 3/1975 | Mikolajczak et al. | |
| 3,904,308 A | 9/1975 | Ribaud | |
| 3,904,312 A | 9/1975 | Exley | |
| 3,917,434 A | 11/1975 | Bandukwalla | |
| 3,956,887 A | 5/1976 | MacDonald | |
| 3,971,209 A | 7/1976 | de Chair | |
| 3,989,406 A | 11/1976 | Bliss | |
| 3,993,414 A | 11/1976 | Meauze et al. | |
| RE29,128 E | 2/1977 | Sohre | |
| 4,006,997 A | 2/1977 | Friberg et al. | |
| 4,011,028 A | 3/1977 | Borsuk | |
| 4,012,165 A | 3/1977 | Kraig | |
| 4,012,166 A | 3/1977 | Kaesser et al. | |
| 4,070,824 A | 1/1978 | Traut | |
| 4,123,196 A | 10/1978 | Prince, Jr. et al. | |
| 4,156,344 A | 5/1979 | Cuthbertson et al. | |
| 4,199,296 A * | 4/1980 | de Chair | 415/181 |
| 4,212,585 A | 7/1980 | Swarden et al. | |
| 4,241,576 A | 12/1980 | Gertz | |
| RE30,720 E | 8/1981 | Sohre | |
| 4,408,957 A | 10/1983 | Kurzrock et al. | |
| 4,445,816 A | 5/1984 | Ribaud et al. | |
| 4,479,755 A | 10/1984 | Skoe | |
| 4,678,398 A | 7/1987 | Dodge et al. | |
| 5,123,811 A | 6/1992 | Kuroiwa | |
| 5,277,549 A | 1/1994 | Chen et al. | |
| 5,286,162 A | 2/1994 | Veres | |
| 5,445,496 A | 8/1995 | Brasz | |
| 5,554,000 A | 9/1996 | Katoh et al. | |
| 5,676,522 A | 10/1997 | Pommel et al. | |
| 5,704,764 A | 1/1998 | Chupp et al. | |
| 5,709,076 A * | 1/1998 | Lawlor | 60/39.35 |
| 5,782,079 A | 7/1998 | Chiang et al. | |
| 6,017,186 A | 1/2000 | Hoeger et al. | |
| 6,263,660 B1 | 7/2001 | Lawlor | |
| 6,279,309 B1 | 8/2001 | Lawlor et al. | |
| 6,298,653 B1 | 10/2001 | Lawlor et al. | |
| 6,334,299 B1 * | 1/2002 | Lawlor | 60/39.35 |
| 6,434,924 B1 | 8/2002 | Lawlor | |
| 6,446,425 B1 * | 9/2002 | Lawlor | 60/768 |
| 6,488,469 B1 | 12/2002 | Youssef et al. | |
| 6,507,125 B1 | 1/2003 | Choi | |
| RE38,040 E | 3/2003 | Spear et al. | |
| 6,682,301 B2 | 1/2004 | Kuhne | |
| 6,694,743 B2 * | 2/2004 | Lawlor et al. | 60/772 |
| 7,293,955 B2 * | 11/2007 | Lawlor et al. | 415/90 |
| 7,334,990 B2 * | 2/2008 | Lawlor et al. | 416/20 R |
| 2002/0073714 A1 | 6/2002 | Yim et al. | |

FOREIGN PATENT DOCUMENTS

| | | |
|---|---|---|
| FR | 863484 | 1/1941 |
| GB | 648647 | 1/1951 |
| JP | 11-351191 | 12/1999 |
| JP | 11-351191 A | 12/1999 |
| JP | 2001-29575 | 10/2001 |
| JP | 2001-295775 A | 10/2001 |

OTHER PUBLICATIONS

Mayekawa Mfg. Co., Patent Abstracts of Japan, Publication No. 2001-29575, Application No. 2001104506, Application Date: Oct. 26, 2001; High Pressure Compressor (in English language) (2 pages).

Mayekawa Mfg. Co., Patent Abstracts of Japan, Publication No. 2001-295775A, Application No. 2001104506, Publication Date: Oct. 26, 2001; High Pressure Compressor (in English language) (2 pages).

* cited by examiner

FIG. 4
FIG. 5
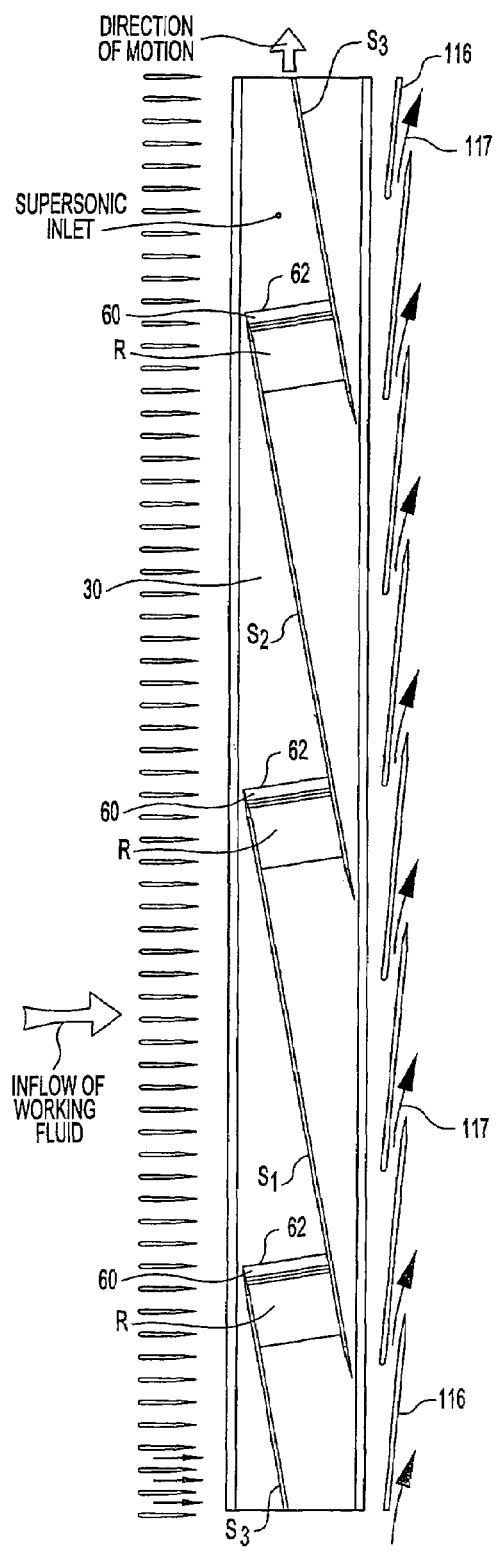
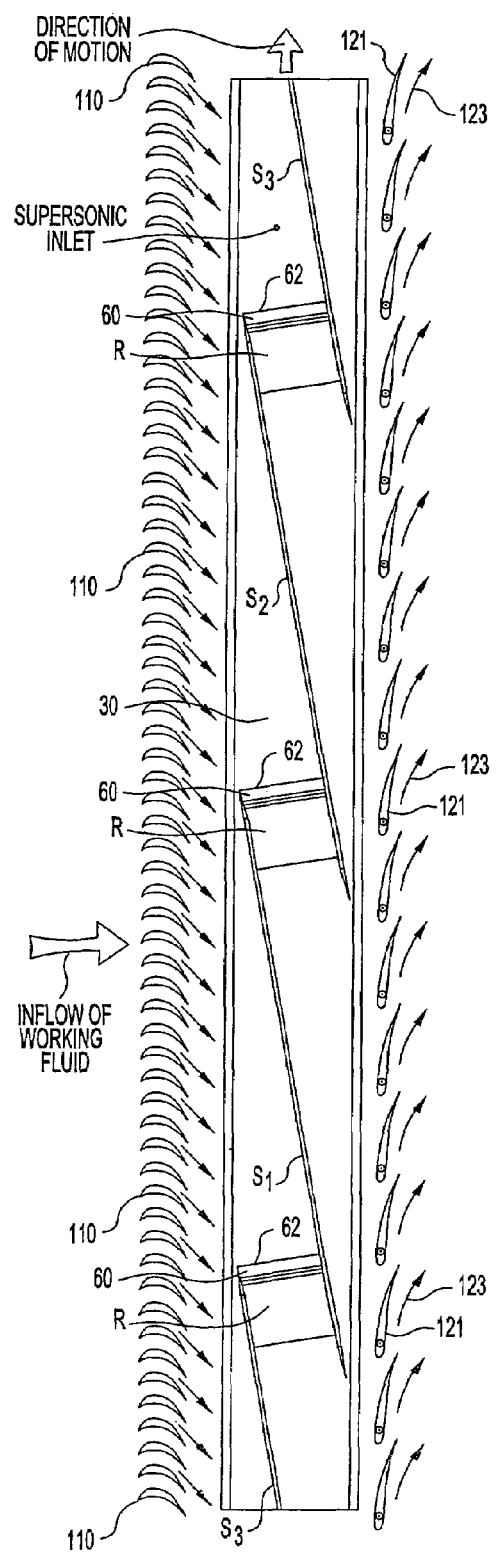

GAS TURBINE POWER PLANT WITH SUPERSONIC SHOCK COMPRESSION RAMPS

RELATED PATENT APPLICATIONS

This application is a Continuation-In-Part of prior U.S. patent application Ser. No. 10/672,358, filed Sep. 25, 2003 now abandoned, entitled GAS TURBINE POWER PLANT WITH SUPERSONIC GAS COMPRESSOR, (assigned on Mar. 16, 2004 and Mar. 29, 2004 and recorded on Apr. 19, 2004 at Reel/Frame 015230/0021 to Ramgen Power Systems, Inc. of Bellevue, Wash.), which utility application claimed priority from prior U.S. Provisional Patent Application Ser. No. 60/414,796, filed on Sep. 26, 2002, the disclosures of which are incorporated herein in their entirety by this reference, including the specification, drawings, and claims of each application.

STATEMENT OF GOVERNMENT INTEREST

This invention was made with United States Government support under Contract No. DE-FC026-00NT40915 awarded by the United States Department of Energy. The U.S. Government has certain rights in the invention.

COPYRIGHT RIGHTS IN THE DRAWING

A portion of the disclosure of this patent document contains material that is subject to copyright protection. The applicant no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates-to a high efficiency, novel gas turbine power plant, in which saving of power as well as improved compression performance and durability are attained by the use of supersonic shock compression of the inlet air. Power plants of that character are particularly useful in stationary electric power generating equipment.

BACKGROUND

A continuing demand exists for simple, highly efficient and inexpensive power plants as may be useful in a wide variety of applications, particularly including electrical power generator sets. Importantly, gas turbine power plant applications could substantially benefit from incorporating a compressor that offers a significant efficiency improvement over currently utilized designs. In view of increased energy costs, particularly for both for electricity and for natural gas, it would be desirable to attain reduction in parasitic energy loses involved in inlet combustion gas compression. Importantly, it would be quite advantageous to provide a novel gas turbine power plant which provides improvements (1) with respect to reduced parasitic losses for gas compression, (2) with respect to reduced first cost for the equipment, and (3) with respect to reduced maintenance costs. Fundamentally, particularly from the point of view of reducing long term energy costs, this would be most effectively accomplished by attaining inlet combustion gas compression at a higher overall cycle efficiency than is currently known or practiced industrially. Thus, the important advantages of a new gas turbine power plant design which incorporates the desirable feature of improved efficiency, particularly at part load operation, can be readily appreciated.

SUMMARY

We have now invented a gas turbine power plant based on the use of a gas turbine driven inlet gas compression rotor having a compression ramp traveling at a local supersonic inlet velocity (based on the combination of inlet gas velocity and tangential speed of the ramp) which compresses inlet combustion gas against a stationary sidewall. In using this method to compress inlet combustion gas, the supersonic compressor efficiently achieves high compression ratios while utilizing a compact, stabilized gasdynamic flow path. Operated at supersonic speeds, the inlet stabilizes an oblique/normal shock system in the gasdynamic flow path formed between the rim of the rotor, the strakes, and a stationary external housing.

Efficiency can be further enhanced by using a pre-swirl inlet compressor wheel prior to entry of gas to the supersonic compression ramp. Such pre-swirl inlet compression wheel (a) provides an initial pressure boost over incoming (often ambient atmospheric pressure, in the case of air compression) gas pressure, and (b) energizes inlet gas in a counterswirling direction to impart an initial velocity vector on the inlet gas so as to increase apparent mach number when the inlet gas is ingested by the supersonic compression ramp.

By use of a gas bypass valve arrangement, the low pressure compressed combustion gas output (i.e., mass flow rate) from the pre-swirl compressor unit can be turned down as necessary while maintaining high rotating velocity (utilizing a fixed shaft speed, i.e., constant rotating velocity where necessary or desirable), such as is necessary when utilizing constant speed compressor apparatus, while maintaining minimal output loads. Moreover, this technique allows maintenance of relatively high efficiency compression with good turn down capability, since the supersonic compressor wheel continues to operate at an efficient high speed condition. In turn, the reduced mass flow of inlet combustion gas allows easy control and turndown of the combustion gases exiting the combustor, so that the power output of the gas turbine power plant is easily controlled.

The structural and functional elements incorporated into this novel gas turbine power plant design overcomes significant and serious problems which have plagued earlier attempts at supersonic compression of gases in gas turbine power plant applications. First, at the Mach numbers at which the compressor in our device operates (in the range from about Mach 1.5 or lower to about Mach 4.0), the design minimizes aerodynamic drag. This is accomplished by both careful design of the shock geometry, as related to the rotating compression ramp and the stationary wall, as well as by effective use of a boundary layer control and drag reduction technique. Thus, the design minimizes parasitic losses to the compression cycle due to the drag resulting simply from rotational movement of the rotor. This is important commercially because it enables the compressor to avoid large parasitic losses that undesirably consume energy and reduce overall efficiency of the gas turbine power plant.

Also, more fundamentally, the compressor design utilized in this turbine power plant can develop high compression ratios with very few aerodynamic leading edges. The individual leading edges of the thousands of rotor and stator blades in a conventional high pressure ratio compressor, as currently utilized in the gas turbine industry, contribute to the vast majority of the viscous drag loss of such systems. However, since the design of the gas turbine power plant disclosed herein utilizes, in one embodiment, less than five individual aerodynamic leading edges subjected to stagnation pressure, viscous losses are significantly reduced, compared to conventional gas turbine compressor sections heretofore known or utilized. As a result, the compression section of the novel gas turbine power plant disclosed and claimed herein has the potential to be up to ten percentage points more efficient than the compressor utilized in a conventional gas turbine, when compared at compression ratios in the range from about ten to one (10:1) to about thirty to one (30:1).

Second, the selection of materials and the mechanical design of rotating components in the compressor section of the power plant provided herein avoids use of excessive quantities or weights of materials (a vast improvement over large rotating mass bladed centrifugal compressor designs). Yet, the design provides the necessary strength, particularly tensile strength where needed in the rotor, commensurate with the centrifugal forces acting on the extremely high speed rotating components.

Third, the design provides for effective mechanical separation of the low pressure incoming gas from the exiting high pressure gases, while allowing gas compression operation along a circumferential pathway.

This novel design enables the use of lightweight components in the gas compression pathway. To solve the above mentioned problems, we have now developed compressor design(s) for gas turbine power plants which overcome the problems inherent in the heretofore known apparatus and methods known to us which have been proposed for the application of supersonic gas compression to gas turbine engines. Of primary importance, we have now developed a low drag rotor which has one or more gas compression ramps mounted at the distal edge thereof. A number N of peripherally, preferably partially helically extending strakes S partition the entering gas flow sequentially to the inlet to a first one of the one or more gas compression ramps, and then to a second one of the one or more gas compression ramps, and so on to an Nth one of the one or more gas compression ramps. Each of the strakes S has an upstream or inlet side and a downstream or outlet side. For rotor balance and gas compression efficiency purposes, in one embodiment the number X of gas compression ramps R and the number of strakes N are the same positive integer number, and in such embodiment, N and X is at least equal to two. In an embodiment shown herein, the number of strakes N and the number X of gas compression ramps R are both equal to three. The compressed gas exiting from each of the one or more gas compression ramps is effectively prevented from "short circuiting" or returning to the inlet side of subsequent gas compression ramps by the strakes S. More fundamentally, the strakes S act as a large screw compressor fan or pump to move compressed combustion gases along with each turn of the rotor.

To accommodate the specific strength requirements of high speed rotating service, various embodiments for an acceptable high strength rotor are feasible. In one embodiment, the rotor section may comprise a carbon fiber disc. In another, it may comprise a high strength steel hub. In each case, the combustion gas compression ramps and strakes S may be integrally provided, or rim segments and gas compression modules may be releasably and replaceably affixed to the rotor.

Attached at the radial edge of the rotor are one or more of the at least one combustion gas compression ramps. The combustion gas compression ramps are situated so as to engage and to compress that portion of the entering gas stream which is impinged by the gas compression ramp upon its rotation, which in one embodiment, is about the aforementioned shaft. The compressed gases escape rearwardly from the gas compression ramp, and decelerate and expands outwardly into a gas expansion diffuser space or volute, prior to entering a compressed gas outlet nozzle. The compressed combustion gases are then routed to the burner can(s) for mixing with fuel, and then the hot combustion gases are routed outward through a gas turbine, to turn the shaft, thus powering the inlet combustion gas compressor, as well as to provide output shaft power.

Finally, many variations in the gas turbine power plant provided herein, such as gas flow configuration and in provision of the inlet gas preswirl compression, and in providing outlet gas passageways, or various gas turbine arrangements, may be made by those skilled in the art without departing from the teachings hereof. Finally, in addition to the foregoing, this novel gas turbine power plant is simple, durable, and relatively inexpensive to manufacture and to maintain.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein:

FIG. 4 illustrates a circumferential view of the gas flow path into and out of the rotating shock compressor wheel, without an inflow pre-swirl feature, in that the inlet guide vanes function only as a flow straightener imparting no pre-swirl into the flow before it is ingested by the shock compression ramp on the rotor; this figure also illustrates the use of a radial diffuser downstream of the discharge side of the rotating shock compression ramp.

FIG. 5 illustrates a circumferential view of the gas flow path into and out of the rotating shock compressor wheel, similar to the view just provided in FIG. 4, but now providing illustrating the use of an inlet guide vane array that imparts pre-swirl into the gas flow prior to entry into the shock compression ramp on the rotor; this figures also illustrates the use of a stationary diffusion cascade that achieves flow expansion largely in the axial direction.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the gas turbine power plant including a supersonic gas compressor and a stationary burner, especially as applied for different variations of the functional components illustrated, may be utilized in order to provide a robust gas turbine power plant having a supersonic gas compression unit and stationary burner, and still be within the overall teachings of the present invention, and the legal equivalents thereof.

DETAILED DESCRIPTION

Figure 1:
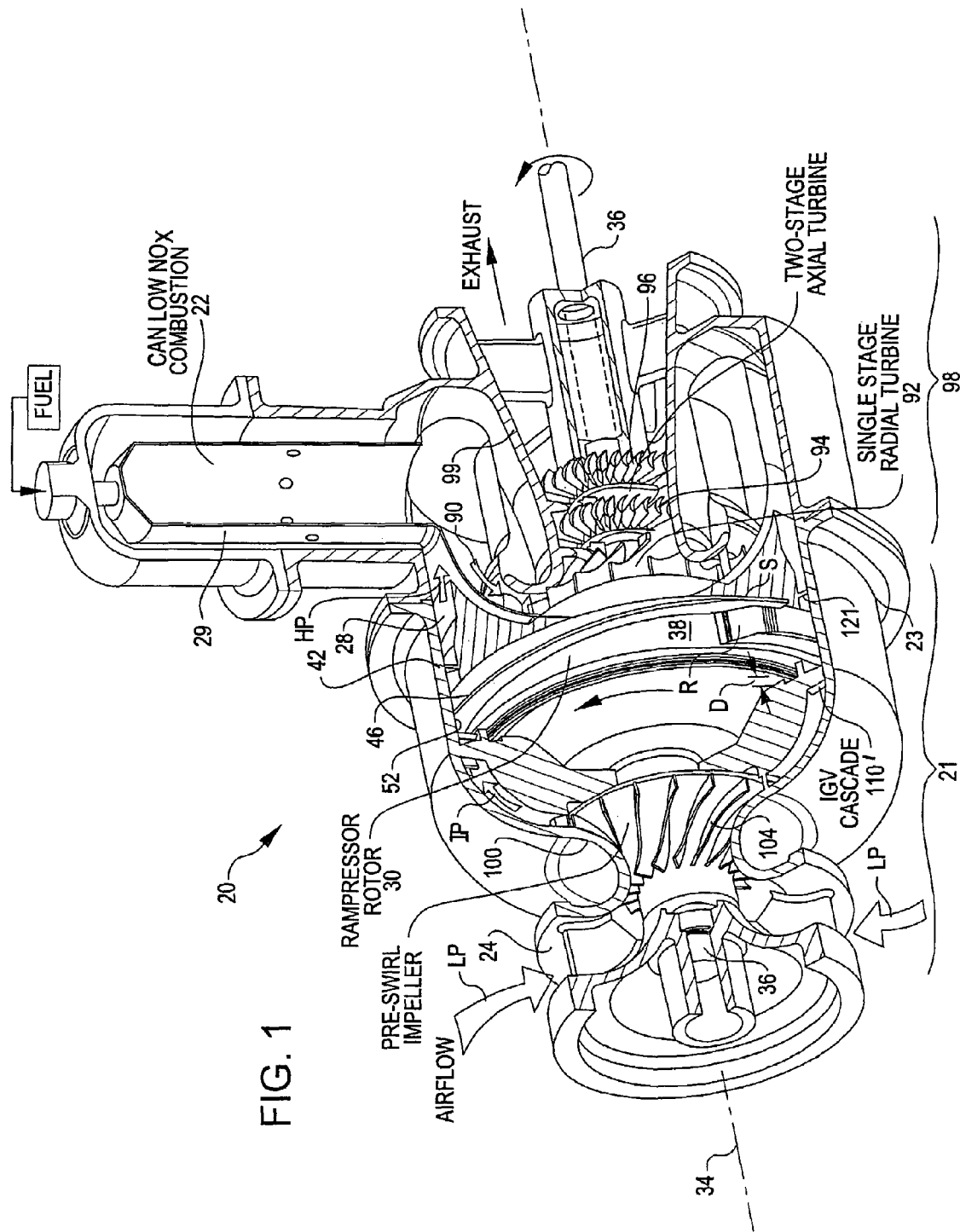
FIG. 1 provides a partially cut away perspective view of a gas turbine generator set, showing the use of a single supersonic gas compressor wheel and with an integrally mounted, directly driven centrifugal inlet pre-swirl gas impeller wheel mounted in the inlet gas stream to compress the inlet low pressure gas from a combustion gas source to an intermediate pressure before feed to each of the supersonic gas compressors, and, mounted on a common shaft, a gas turbine section having a single stage radial turbine and two stage axial turbines for generation of output shaft power.

Referring now to the drawing, FIG. 1 depicts a partial cut-away perspective view of our gas turbine power plant 20 utilizing a novel supersonic gas compression apparatus 21 in conjunction with a stationary can combustor 22. Major components shown in this FIG. 1 include a stationary housing or case 23 a first 24 inlet for supply of low pressure combustion gas to be compressed, and a high pressure compressed gas outlet throat 28, from whence the compressed combustion gases exit to enter the compressed gas chamber 29 in burner can 22. In this design, a first rotor 30 is provided, having a central axis defined along centerline 34, here shown defined by common shaft 36 (see FIG. 9 also), and adapted for rotary motion therewith, in case 23. The first rotor 30 extends radially outward from its central axis to an outer surface portion 38, and further to an outer extremity 40 on strakes S. On first rotor 30, one or more supersonic shock compression ramps R are provided. Each one of the supersonic shock compression ramps R forms a feature on the outer surface portion 38 of first rotor 3Q. Within housing 23, a first circumferential stationary interior peripheral wall 42 is provided radially outward from first rotor 30. Stationary interior peripheral wall 42 is positioned radially outward from the central axis defined by centerline 34, and is positioned very slightly radially outward from the outer extremity 40 of first rotor 30. The first stationary peripheral wall 42 has an interior surface portion 52. Each one of the one or more supersonic shock compression ramps R cooperates with the interior surface portion 52 of the stationary peripheral wall 42 to compress incoming combustion gas therebetween.

One or more helical strakes S are provided adjacent each one of the one or more supersonic compression ramps R. An outwardly extending wall portion SW of each of the one or more strakes S extends outward from at least a portion of the outer surface portion 38 of rotor 30 along a height HH (see FIG. 9) to a point adjacent the interior surface portion 52 of the peripheral wall 42. The strakes S effectively separate the low pressure inlet gas from high pressure compressed gas downstream of each one of the supersonic gas compression ramps R. Strakes S are, in the embodiment illustrated by the circumferential flow paths depicted in FIGS. 4 and 5, provided in a helical structure extending substantially radially outward from the outer surface portion 38 of the first rotor 30. As shown in FIGS. 4 and 5, the number of the one or more helical strakes S is N, and the number of the one or more supersonic gas compression ramps R is X, and the number N of strakes S is equal to the number X of compression ramps R. The strakes S1 through SN partition entering gas so that the gas flows to the respective gas compression ramp R then incident to the inlet area of the gas compressor. As can be appreciated from FIG. 9, the preferably helical strakes S1, S2, and S3 are thin walled, with about 0.15" width (axially) at the root, and about 0.10" width at the tip. With the design illustrated herein, it is believed that leakage of gases will be minimal.

For rotor 30 balance purposes, we prefer that the number X of gas compression ramps R and the number N of strakes S be the same positive integer number, and that N and X each be at least equal to two. In one embodiment, N and X are equal to three as illustrated herein. The strakes S1 through SN allow feed of gas to each gas compression ramp R without appreciable bypass of the compressed high pressure gas to the entering low pressure gas. That is, the compressed gas is effectively prevented by the arrangement of strakes S from "short circuiting" and thus avoids appreciable efficiency losses. This strake feature can be better appreciated by evaluating the details shown in FIG. 9, where strakes S1 and S2 revolves in close proximity to the interior wall surface 52. The strakes S1 and S2 have a localized height HS1 and a localized height HS2, respectively, which extends to a tip end TS1 and TS2 respectively, that is designed for rotation very near to the interior peripheral wall surface of housing 23, to allow for fitting in close proximity to the tip end TS1 or TS2 with that wall.

Figure 3:
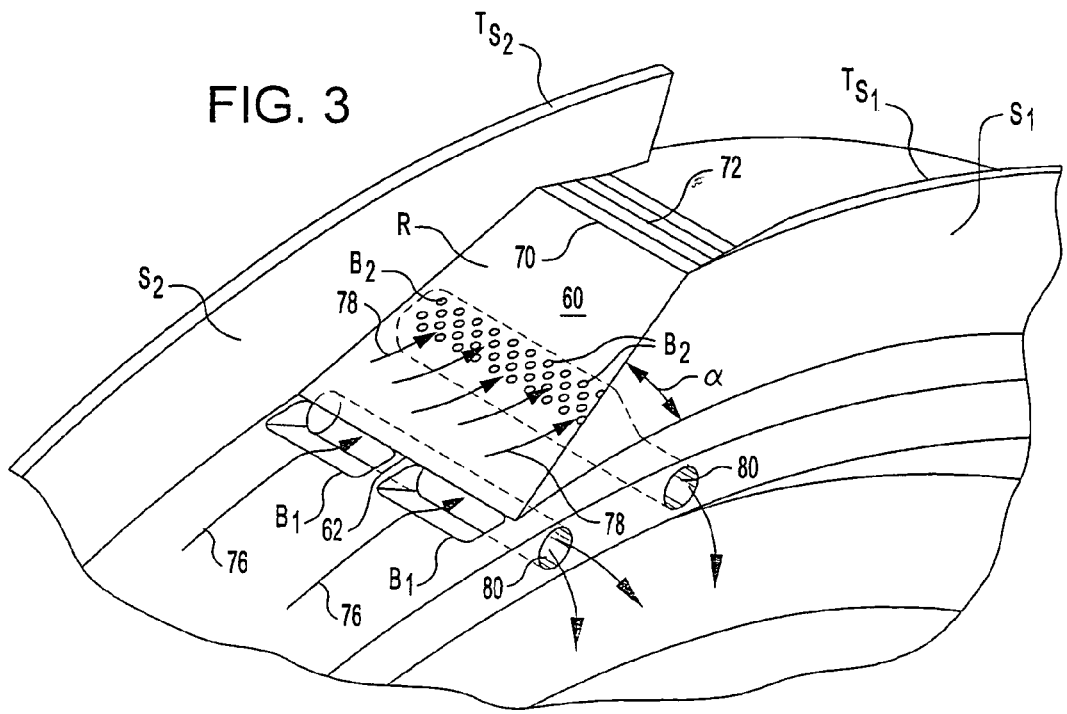
FIG. 3 is a perspective view providing a close up of the compression ramp portion on a rotor, showing bleed ports for accommodating bleed of boundary layer gas at two positions on the gas compression ramp, as well as showing outlets for each bleed port into the rotor wheel space.
Figure 6:
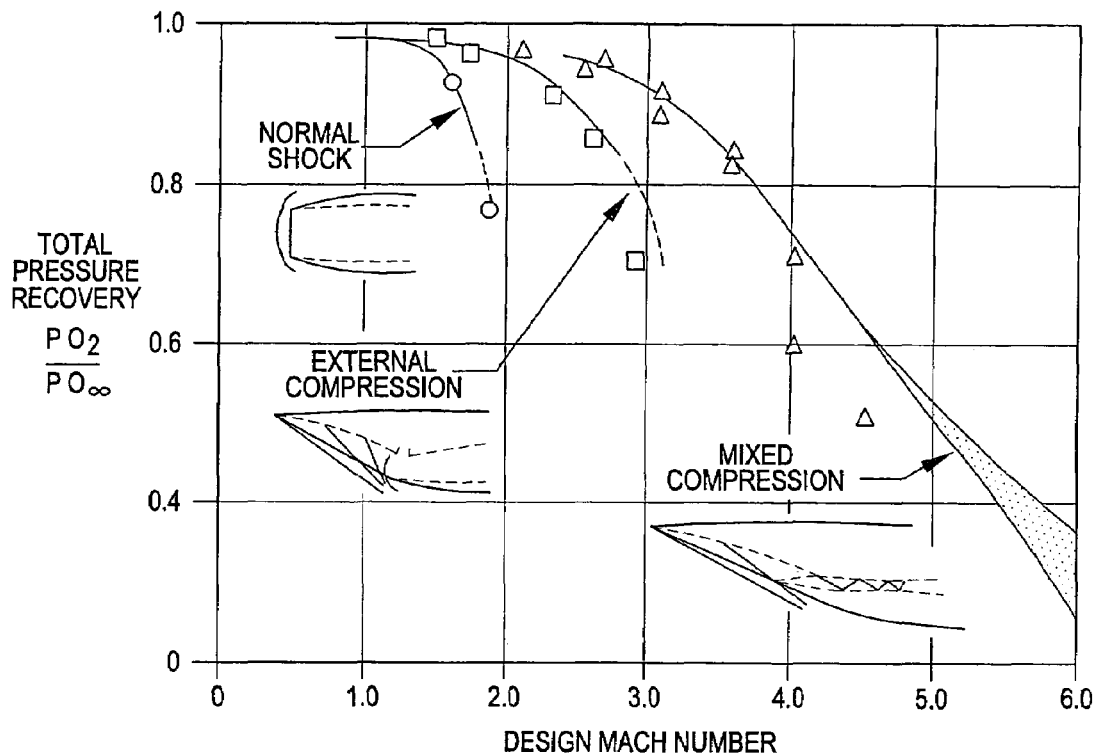
FIG. 6 provides a comparison of various prior art compression efficiencies, in terms of total pressure ratio, based on three different types of inlets utilized in supersonic flight applications, namely, normal shock compression, external shock compression, and mixed compression, to enable the reader to appreciate the advantages provided by integrating the features of external and mixed compression inlets in the compressor design disclosed and claimed herein; note that a small illustration of the shock pattern is provided for each type of inlet for which data is provided.

As seen in FIG. 3, in each of the gas compression ramps R, the inlet gas stream is compressed at apparent supersonic velocity, to create an oblique/normal shock structure between the respective gas compression ramp and the adjacent peripheral wall. Each of the one or more gas compression ramps R has an outwardly sloping gas compression ramp face 60. The face 60 has a base 62 which is located adjacent the intersection of the outwardly sloping face 60 and the outer surface portion 38 of the respective rotor 30 or 32. The face 60 and the outer surface 38 of rotors 30 and 32 intersect at a preselected design angle alpha α of from about one (1) degree to about fifteen (15) degrees, which angle alpha varies based on the design mach number and gas properties, such as temperature and density. The gas compression ramps R also include a throat 70, and downstream thereof, an inwardly sloping gas deceleration section 72. The deceleration-transition section 72 is provided to step-down to the outer surface 38 of the rotor 30 or 32.

For improving efficiency, each of the one or more gas compression ramps R has one or more boundary layer bleed ports B. In the configuration illustrated in FIG. 3, at least one of the one or more boundary bleed ports B is located at the base 62 of the gas compression ramp R. As depicted, a pair of shovel-scoop shaped cutouts B1 are shown, each having a generally parallelepiped sidewall 64 configuration. Bleed air enters structures B1 as indicated by reference arrows 76 in FIG. 3. Also, as shown in FIG. 3, at least one of the one or more boundary bleed ports B2 are located on the face 60 of the gas compression ramp R. Bleed air enters structures B2 as indicated by reference arrows 78 in FIG. 3. As depicted in FIG. 3, each one of the gas compression ramps R further comprise a bleed air receiving chamber 80, each of which is configured for effectively containing therein, for ejection therefrom, bleed air provided thereto, as indicated by exit bleed air reference arrows 84 in FIG. 3.

Figure 9:
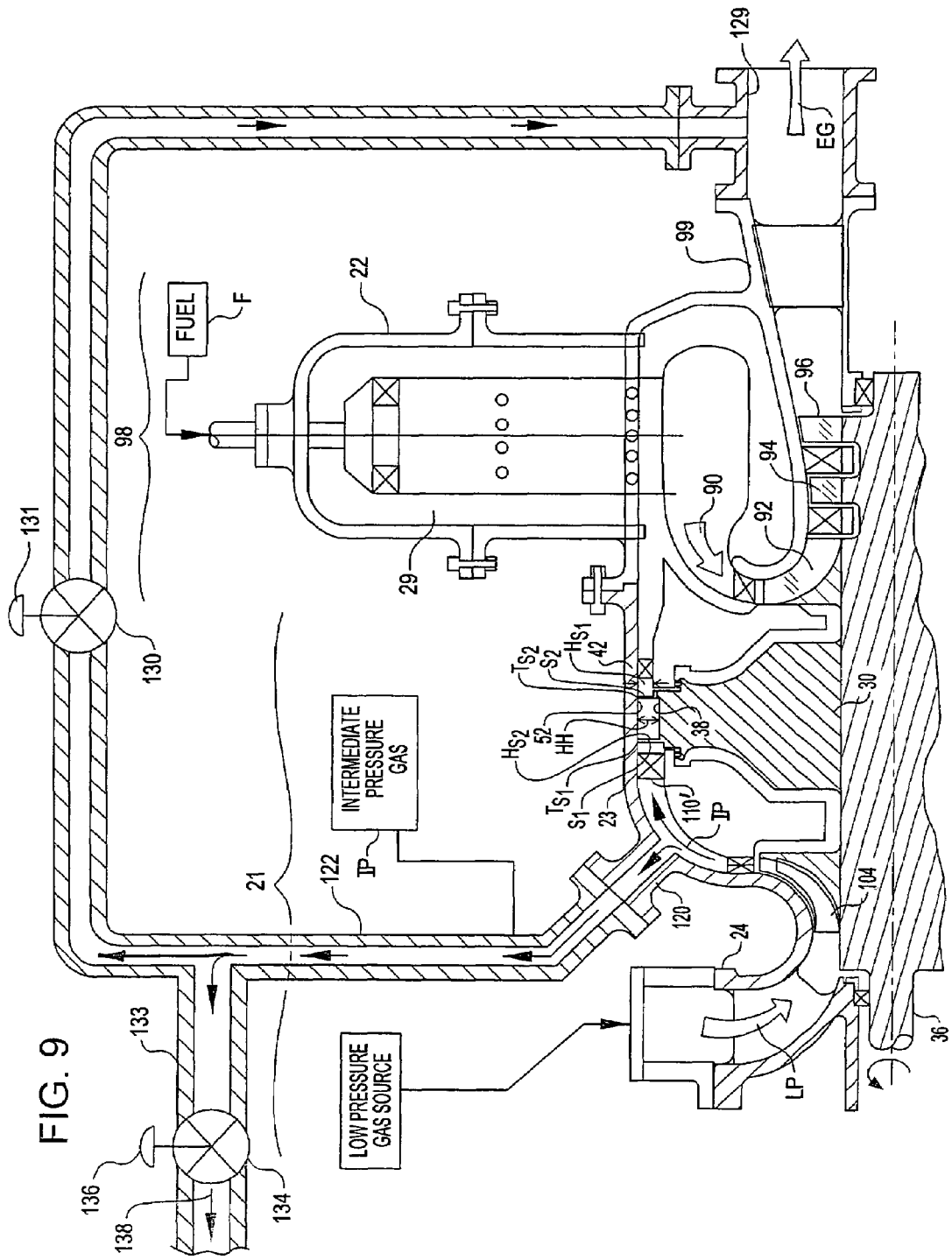
FIG. 9 provides a partial cross-sectional view of one embodiment for a novel gas turbine power plant utilizing a supersonic combustion gas compressor, and further illustrates, from a process flow diagram point of view, the use of intermediate gas bypass which enables provision of variable inlet mass flow to the supersonic compression ramp on a constant speed rotor, and which incidentally also shows the close fitting relationship of the rotor strakes with the interior surface of the stationary peripheral wall against which gas compression occurs, and one position of strakes as the rotor turns about its axis of rotation.

As depicted in FIG. 1, downstream of first rotor 30 is a first high pressure gas outlet throat 28, configured to receive and pass therethrough high pressure outlet gas resulting from compression of inlet combustion gas by the one or more gas compression ramps R on the 30, and transfer the high pressure combustion gas to the compressed gas chamber 29 in can combustor(s) (i.e. burner cans) 22. One or more stationary low NOx type can combustors 22 can be utilized, often with the general configuration as illustrated in FIGS. 1 and 9, to receive the output from the gas outlet throat 28 and mix the compressed air with fuel, such as natural gas or liquid hydrocarbon, to oxidize the fuel to create high temperature, pressurized combustion gases 90 for feed to (1) a single stage radial turbine 92, (2) a first axial turbine stage 94, and (3) a second axial turbine stage 96, or other suitable turbine arrangement as will be found useful by those of ordinary skill in the art and to whom this specification is directed, to generate a motive force by thrust reaction of the combustion gases against the turbines. These turbine stages are provided in turbine section 98, which includes an outer casing 99.

For improved efficiency and operational flexibility, the compressor 20 may be designed to further include a first inlet casing portion 100 having therein a pre-swirl impeller 104. The pre-swirl impeller 104 is located intermediate the low pressure gas inlet 24 and first rotor 30. The pre-swirl impeller 104 is configured for compressing the low pressure inlet combustion gas LP to provide an intermediate pressure gas stream IP at a pressure intermediate the pressure of the low pressure inlet combustion gas LP and the high pressure outlet gas HP, as noted in FIG. 9. In one application for the apparatus depicted, combustion air at ambient atmospheric conditions of 14.7 psig is compressed to about 20 psig by the pre-swirl impeller 104. However, the pre-swirl impeller can be configured to provide a compression ratio of up to about 2:1. More broadly, the pre-swirl impeller can be configured to provide a compression ratio from about 1.3:1 to about 2:1.

Also, for improving efficiency, the gas turbine power plant 20 can be provided in a configuration wherein, downstream of the pre-swirl impeller 104 but upstream of the one or more gas compression ramps R on rotor 30, a plurality of inlet guide vanes, are provided, such as set of straight inlet guide vanes 110 in FIG. 4. For better efficiency, a set of curved inlet guide vanes 110' as illustrated in FIG. 5 are utilized impart a spin on gas passing therethrough so as to increase the apparent inflow velocity of gas entering the one or more gas compression ramps R. Additionally, such inlet guide vanes 110' assist in directing incoming gas in a trajectory which more closely matches gas flow path through the ramps R, to allow gas entering the one or more gas compression ramps to be at approximately the same angle as the angle of offset, to minimize inlet losses.

In one embodiment, as illustrated, the pre-swirl impeller 104 can be provided in the form of a centrifugal compressor wheel. As illustrated in FIG. 1, pre-swirl impeller 104 can be mounted on a common shaft 36 with the rotor 30 and with gas turbines 92, 94, and 96. It is possible to customize the design of the pre-swirl impeller and the inlet guide vane set to result in a supersonic gas compression ramp inlet inflow condition with the same pre-swirl velocity or Mach number but a superatmospheric pressure. Since the supersonic compression ramp inlet basically multiples the pressure based on the inflow pressure and Mach number, a small amount of supercharging at the pre-swirl impellers can result in a significant increase in cycle compression ratio.

In FIG. 4, a circumferential view of the gas flow path into and out of the rotating shock compressor wheel is provided, where the configuration is developed without an inflow pre-swirl feature, in that the inlet guide vanes 110 function only as a flow straightener, imparting no pre-swirl into the flow before it is ingested by the shock compression ramp R on the rotor 30. Note that this figure also illustrates the use of a radial diffuser having a plurality of radial diffuser blades 116, downstream of the discharge side of the rotating shock compression ramp R, to then deflect compressed high pressure gas HP outward toward throat 28 (shown in FIG. 1) in the direction of reference arrows 117.

FIG. 5 illustrates a circumferential view of the gas flow path into and out of the rotating shock compressor R on rotor wheel 30, similar to the view just provided in FIG. 4, but now further illustrating the use of an array of inlet guide vanes 110' that imparts pre-swirl into the gas flow prior to entry into the shock compression ramp R on the rotor 30. Note that this figure also illustrates the use of a stationary diffusion cascade blades 121 that achieves flow expansion largely in the axial direction, as shown by reference arrows 123.

With (or without) the aid of pre-swirl impeller 104, it is important that the apparent velocity of gas entering the one or more gas compression ramps R is in excess of Mach 1, so that the efficiency of supersonic shock compression can be exploited. However, to increase efficiency, it would be desirable that the apparent velocity of gas entering the one or more gas compression ramps R be at least Mach 1.5, and more preferably, in excess of Mach 2. More broadly, the apparent velocity of gas entering the one or more gas compression ramps R can currently practically be between about Mach 1.5 and Mach 3.5, although wider ranges are certainly possible within the teachings hereof.

As depicted in FIG. 9, another aspect of the current invention is the provision, where desirable for maintaining relatively high efficiency at reduced power output from the gas turbine power plant 20, to further include, adjacent the outlet of the pre-swirl impeller 104, an outlet 120 for intermediate pressure gas, and a bypass line 122 between the intermediate outlet 120 and the outlet 129 for exhaust gases EG, so that the bypass line 122 is configured to route a portion of the intermediate pressure gas IP to the hot exhaust gas outlet 129. In this configuration, it is advantageous to utilize gas flow regulating valve 130. The valve 130 is configured to vary the rate of passage of intermediate pressure gas therethrough, so as to in turn vary the amount of intermediate pressure gas entering the one or more gas compression ramps R on rotor 30. In one embodiment, valve 130 is adjustable at any preselected flow rate from (a) a closed position, wherein the valve 130 seals the bypass line 122, so that as a result substantially no intermediate pressure gas escapes to the exhaust gas outlet 129, and (b) an open position, wherein the valve 130 allows fluid communication between the pre-swirl impeller outlet 120 and the hot gas outlet 129, or (c) a preselected position between the closed position and the open position.

With respect to the configuration just described in conjunction with FIG. 9, it must be appreciated that it is possible to customize the design of the pre-swirl impeller 104, or comparable axial compressor stage, so as to provide supersonic inlet flow conditions with the same pre-swirl velocity or Mach number to the ramp R on rotor 30, but at super-atmospheric pressure. Since the supersonic inlet ramp R multiplies the pressure based on the inflow pressure and Mach number, a small amount of inflow "supercharging" via pre-swirl impeller 104 or comparable compressor can result in a significant increase in cycle compression ratio. Importantly, increasing the cycle compression ration can result in an increase in cycle thermal efficiency so long as component efficiencies can be maintained.

In one embodiment, this design concept can be achieved by providing the inlet guide vanes and the pre-swirl compressor 104 so as to supply the rotating supersonic inlet ramps R with constant super-atmospheric conditions. In an alternate design, as illustrated by the embodiment depicted in FIG. 9, supersonic inflow conditions can be varied during operation of the engine system. As noted above, a controlled portion of compressed air is sent via bypass line 122 between the intermediate outlet 120 and the outlet 129 for exhaust gases EG, so that the bypass line 122 is configured to route a portion of the intermediate pressure gas IP to the hot exhaust gas outlet 129, downstream of the turbine expansion process, here shown through gas turbine stages 92, 94, and 96. Bypass valve 130 and associated control valve 131 thus allows the mass flow through the supersonic gas compression system to be varied during engine operation. This feature can be utilized to facilitate the starting of the engine by better matching the mass flow through the system with the preferred operational requirements of the rotating supersonic inlet ramps R.

Also, the just described intermediate pressure gas bypass feature could be employed in the full-speed, part load throttling process of the engine. When properly controlled, such a bypass feature can be used to achieve improved part load emission characteristics compared to a system with no such bypass or comparable variable mass flow features. To further illustrate this feature, attention is directed to FIGS. 10, 11, and 12.

Figure 10:
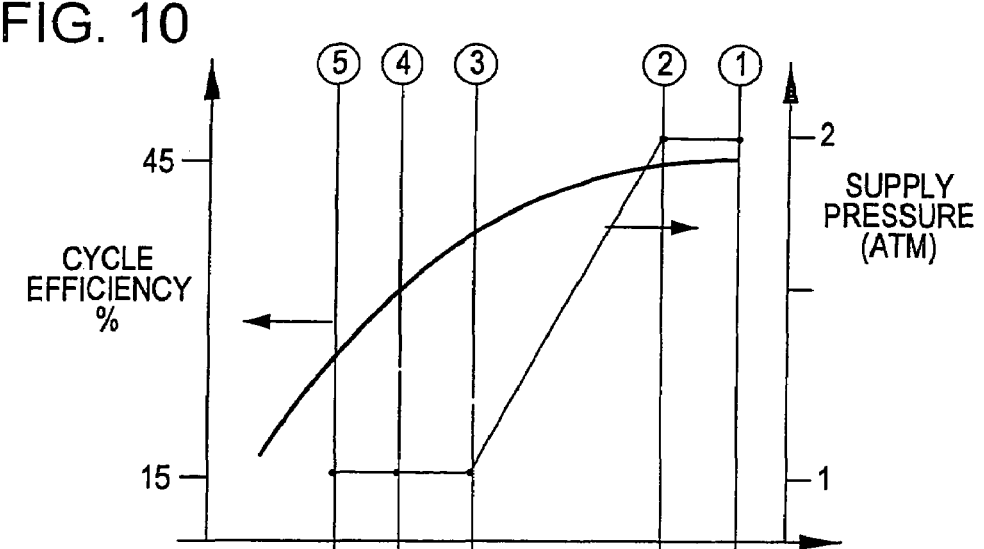
FIG. 10 illustrates the relationship of the overall compression cycle efficiency as a fraction of rated power, when utilizing the variable inlet pressure ramjet engine ("VIPRE™ engine") configuration taught herein.

FIG. 10 shows the variation in cycle efficiency (left hand axis) and inlet guide vane supply pressure (right hand axis) as a fraction of the rated engine output power. This figure illustrates the decrease in inlet guide vane supply pressure resulting from the operation (i.e., opening) of the bypass valve 130. As the bypass valve 130 is progressively opened, intermediate pressure air IP is allowed to bypass the inlet guide vanes through the bypass line 122. As a result of such gas bypass, the supply pressure to the inlet guide vanes decreases. By simultaneously controlling the inlet guide vane discharge pressure with an additional bleed, the bypass or variable geometry feature downstream of the inlet guide vane discharge, but upstream of the rotating inlet ramp R to the supersonic compressor so as to result in a constant pressure drop across the inlet guide vanes, and therefore a constant inlet guide vane discharge velocity. In this way, the pressure of the supersonic inlet flow can be varied while holding the inlet inflow velocity constant.

For further explanation of this just mentioned process, one possible staging of this process is indicated by the five regions depicted in FIG. 10. Station 1 represents full power operation, whereas station 5 represents zero power output operations. With near full load operation, as shown between stations 1 and 2, the bypass valve 130 would be completely closed and a decrease in power output would be achieved by decreasing the fuel flow into the system without changing the mass flow of air through the system. This would result in a decrease in overall equivalence ratio $\phi$ as well as a decrease in combustion flame temperature, as further illustrated in FIG. 11.

To further decrease the output of the system as indicated between regions two and three, where the power output is significantly decreased below rated power, the bypass valve 130 would be progressively opened, resulting in a decreasing pressure in the air supplied to the inlet guide vanes, as well as a decrease in the air pressure supplied to the rotating supersonic compression ramps R. This decrease in pressure results in a decreasing system mass air flow as indicated along the right hand axis in FIG. 11. Note that as the air mass flow was decreased in the region between reference points two and three, the flow of fuel F was simultaneously decreased so as to maintain the equivalence ratio $\phi$ and the combustion flame temperature. As a result, the associated decrease in power output is accomplished without violating the lean extinction limit or the combustion stability limit.

Figure 11:
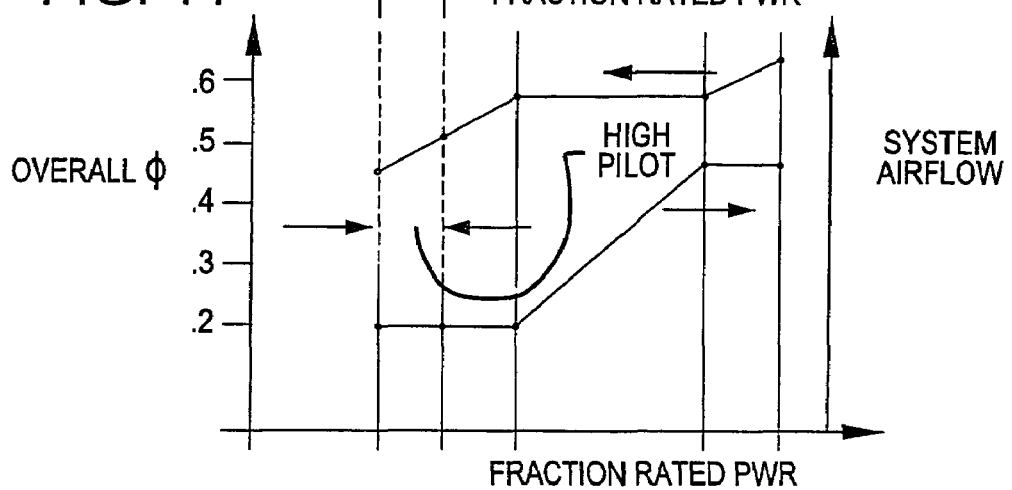
FIG. 11 illustrates the overall system air flow and phi ($\phi$) as a percentage of rated power for the gas turbine power plant taught herein.
Figure 12:
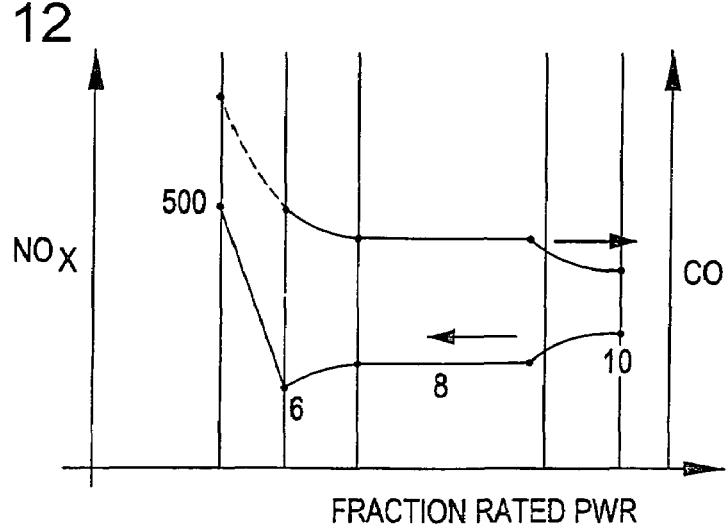
FIG. 12 shows the anticipated levels of NOx and CO as a fraction of rated power, for the gas turbine power plant taught herein.

In the region between reference points three and four, decreasing the output of the engine system, well below 50% of rated power, is accomplished by decreasing the equivalence ratio $\phi$ as shown in FIG. 11. Thus, all of the steps in transitioning from operating conditions indicated by the reference points one through five in FIGS. 10, 11, and 12 are accomplished with the combustion process operating in a lean premix/low NOx mode, to maintain low emissions throughout the load throttling process. This technique allows for expansion of the range of stable combustion in the lean premix mode, which is a significant advantage of this novel method for the control, and especially the part load control, of a gas turbine engine. This can be better appreciated by recognizing that optimized lean premix combustion systems heretofore known or practiced have typically operated near the lean extinction and/or combustion instability limits, so that it was typically not possible to decrease the equivalence ratio $\phi$ (and therefore decrease system power output) without inducing lean extinction or combustion instability. Thus, prior art systems transition to a "high pilot" or diffusion combustion mode for low power operation, which can result in a dramatic increase in emissions that in many applications severely limits the ability of such systems to operate at part power levels.

For the final decrease in system output in the region between reference points four and five in FIGS. 10, 11, and 12, which region is basically from very low percentage of rated power to the condition of approaching idle (or a condition of full speed, but zero power output), the combustors in the engine disclosed herein would be operated in a high pilot mode utilizing a diffusion stabilized flame. As discussed above, and as illustrated in FIG. 12, this results in a dramatic increase in emissions (both NOx and CO), as FIG. 12 shows an increase from about 6 ppm NOx to about 500 ppm NOx during such transition. However, one of the key advantages of the instant method of operation of a gas turbine engine is that it extends the system operating range over which conventional lean premix combustion techniques can be employed to control emissions.

In yet another variation, instead of dumping intermediate pressure compressed inlet gas IP via bypass valve 130 so that the bypassed IP compressed gas ultimately mixes exhaust gases EG, as just described above, a bleed line 133 with bleed valve 134 and associated valve control unit 136 can be utilized to bleed intermediate pressure gas IP to either the atmosphere as indicated by arrow labeled with reference numeral 138, or to a useful application such as a compressed air supply system, or directly to other pressurized gas consumptive uses. In such a case, bypass valve 130 may be closed, or the flow of IP gas may be split, as suitable in a given application.

Figure 7:
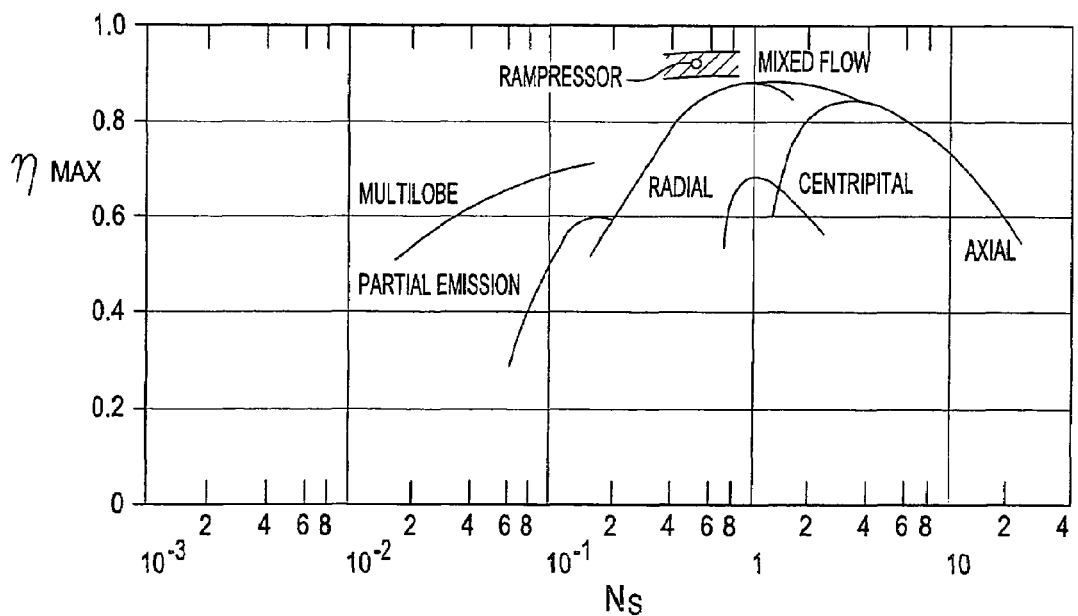
FIG. 7 provides an overview of comparative isentropic compression efficiencies for different types of compressors as a function of non-dimensional specific speed, indicating how the novel supersonic gas compressor disclosed herein can out perform other types of compressors for a certain range of specific speeds.
Figure 8:
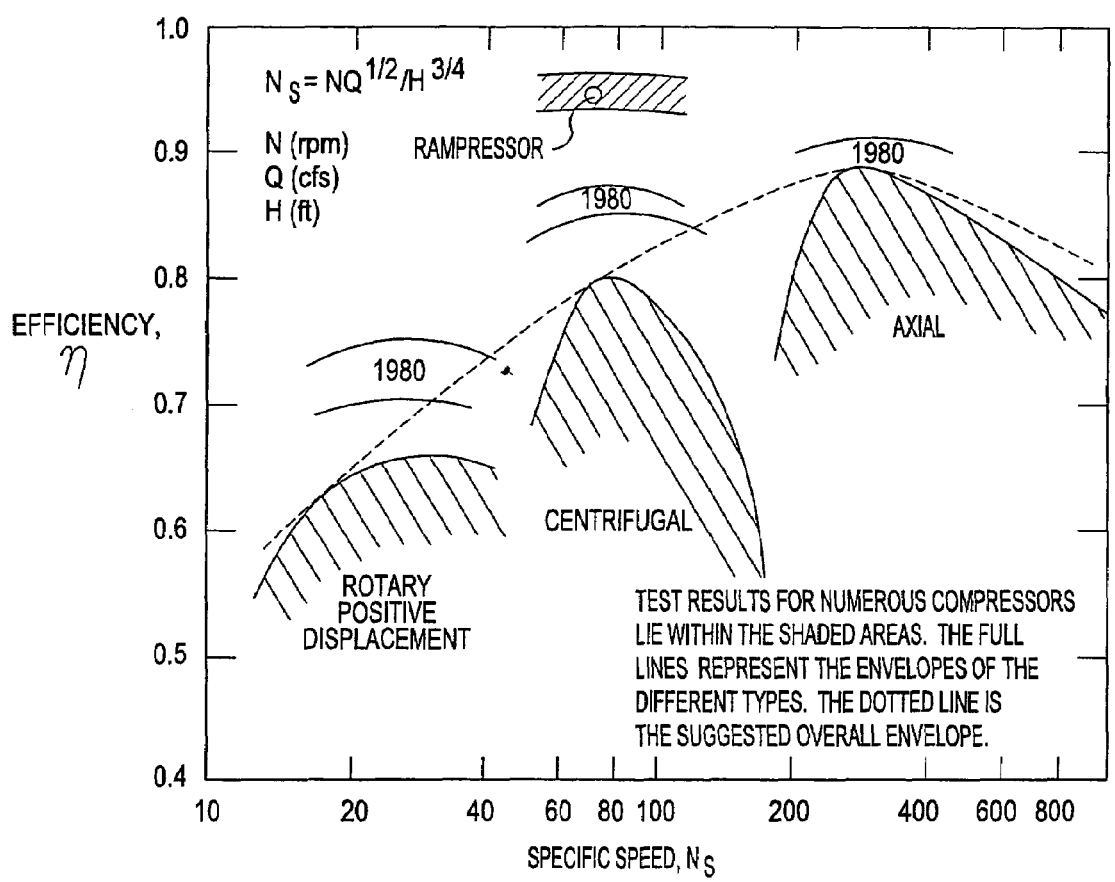
FIG. 8 provides an overview of comparative isentropic compression efficiencies for different types of compressors as a function of non-dimensional specific speed, and also indicates how the novel supersonic combustion gas compressor disclosed herein can out perform other types of compressors for a certain range of specific speeds.

The gas turbine power plant 20 is ideal for many applications requiring a compact, low cost gas turbine power plant. Importantly, the compressor portion 21 of the power plant 20 provides an ideal apparatus for the compression of combustion gases. It has been calculated that the overall compressor apparatus 21 is capable of providing compression of a selected gas at an isentropic efficiency in excess of ninety (90) percent, and, in some ranges, in excess of ninety five (95) percent, as is graphically illustrated in FIGS. 7 and 8: The compressor 21 operates most efficiently at a non-dimensional specific speed from about 60 to about 120. As confirmed by the performance ranges depicted in FIG. 8, the compressor 21 is capable of compressing a selected gas at an isentropic efficiency in excess of ninety five percent.

Figure 2:
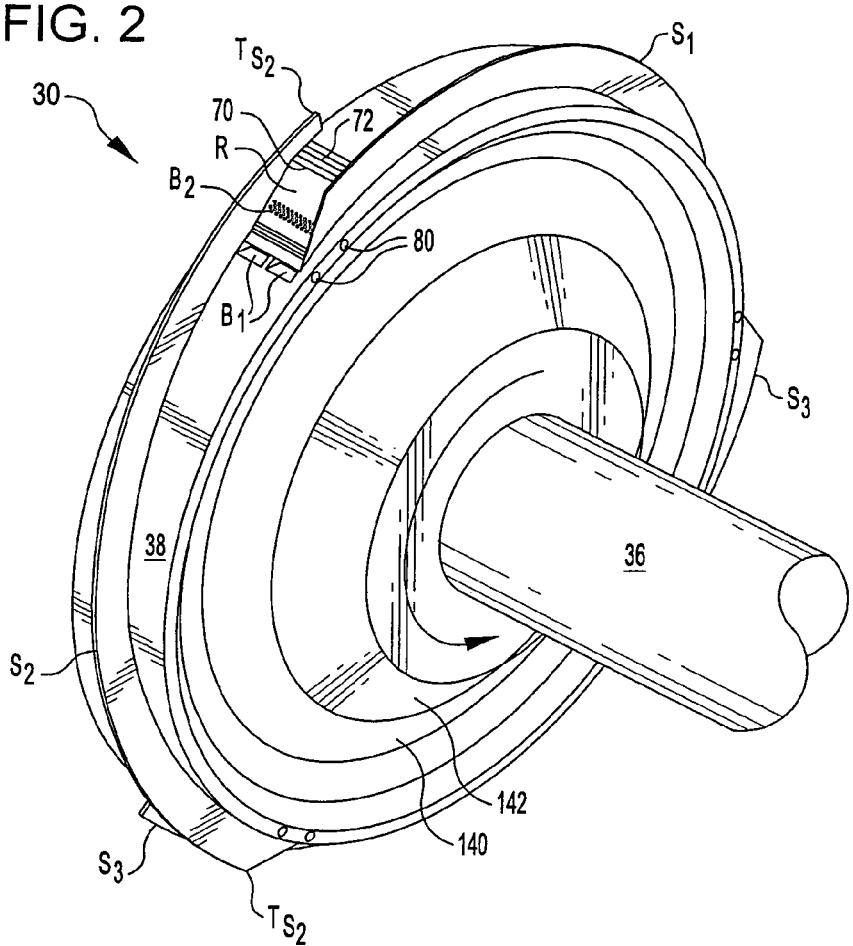
FIG. 2 provides a perspective view of a rotor for a supersonic combustion gas compressor, and in particular, illustrating the gas compression ramp provided with the rotor, the helical strakes, and bleed ports for controlling the boundary layer flow on the gas compression ramp.

For assuring operation at high rotational speed, to achieve high apparent Mach number at the inlet of each of the one or more gas compression ramps R, a high strength rotor 30 is provided. In one embodiment, such a rotor include a high strength central disc. As illustrated in FIG. 2, such rotors, and in particular a central disc portion 140, may include a tapered portion 142, at least in part, i.e., that is thinner at increasing radial distance from the center of rotation. To increase aerodynamic efficiency, at least a portion of such rotor can be confined within a close fitting housing having a minimal distance D between an outer surface of the rotor and an inner surface of the close fitting housing, so as to minimize aerodynamic drag on the rotor. These aspects of the design of such compressors 21 can be seen in FIG. 1.

The compressor 21 disclosed herein allows practice of unique methods of compressing combustion gas for use in a gas turbine engine. Practice of such methods involves providing one or more gas compression ramps on a rotor which is rotatably secured for high speed rotary motion with respect to stationary housing having an inner surface. Each of the one or more gas compression ramps is provided with an inlet, low pressure combustion gas stream. The low pressure gas is compressed between one of the one or more gas compression ramps and the inner surface of the stationary housing which is located circumferentially about the rotor, to generate a high pressure combustion gas therefrom. To achieve gas compression, and to avoid bypass of the compressed gas back to the entering low pressure gas stream, one or more helical, substantially radially extending strakes are provided along the periphery of the rotor. Each on of the one or more strakes S is provided adjacent to one of the one or more gas compression ramps R. At least a portion of each of the one or more strakes S extends outward from at least a portion of an outer surface portion of the rotor to a point adjacent to the inner surface of the stationary housing. The rotor is driven by mechanical power via a gas turbine driven shaft operatively connected to the compressor rotor, and thus to each of the one or more gas compression ramps. In one embodiment, the apparent inlet velocity of the one or more gas compression ramps, i.e., the approach speed between incoming gas and the opposing motion of a selected gas compression ramp R, is at least Mach 1.5. More broadly, the apparent inlet velocity of the one or more gas compression ramps is between Mach 1.5 and Mach 4. At the design point in one embodiment, the apparent inlet velocity of said gas compression ramps is approximately Mach 3.5.

This method of combustion air compression allows high efficiency compression of combustion air for a gas turbine engine power plant. Such an efficient gas turbine power plant will have many important applications.

Overall, the designs incorporated into compressor 21 provide for minimizing aerodynamic drag, by minimizing the number of leading edge surfaces subjected to stagnation pressure within the compressor. In one embodiment, as illustrated herein, the number of leading edge surfaces subjected to stagnation pressure is less than five, i.e, four. And, each of the one or more gas compression ramps are circumferentially spaced equally apart so as to engage a supplied gas stream substantially free of turbulence from the previous passage through a given circumferential location of any one said one or more gas compression ramps. The cross sectional areas of each of the one or more gas compression ramps can be sized and shaped to provide a desired compression ratio. Further, the helical strakes can be offset at a preselected angle delta, and wherein the angle of offset matches the angle of offset of each one of the one or more gas compression ramps, and wherein so that the angles match to allow gas entering the one or more gas compression ramps to be at approximately the same angle as the angle of offset, to minimize inlet losses.

The rotor 30 is rotatably secured in an operating position by a fixed support stationary housing or casing 23 in a manner suitable for extremely high speed operation of the rotor 30, such as rotation rates in the range of 10,000 to 20,000 rpm, or even up to 55,000 rpm, or higher. In this regard, bearing assemblies must provide adequate bearing support for high speed rotation and thrust, with minimum friction, while also sealing the operating cavity, so as to enable provision of a vacuum environment adjacent the rotor disc, to minimize drag. The detailed bearing and lubrication systems may be provided by any convenient means by those knowledgeable in high speed rotating machinery, and need not be further discussed herein.

It is to be appreciated that the various aspects and embodiments of a gas turbine power plant having (a) a supersonic gas compressor, and (b) stationary low NOx can combustor(s), and the method of operating such devices as described herein, are an important improvement in the state of the art. The novel gas turbine power plant having a supersonic gas compressor is simple, robust, reliable, and useful for work in various gas turbine power plant applications. Although only a few exemplary embodiments have been described in detail, various details are sufficiently set forth in the drawings and in the specification provided herein to enable one of ordinary skill in the art to make and use the invention(s), which need not be further described by additional writing in this detailed description.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. A gas turbine power plant, said power plant comprising:
   (a) a compressor section, said compressor section comprising
      (1) an inlet for supply of gas to be compressed;
      (2) a rotor, said rotor having a central axis and adapted for rotary motion thereabout, said rotor extending radially outward from said central axis to an outer surface portion having an outer extremity;
      (3) one or more supersonic shock compression ramps, each one of said supersonic shock compression ramps forming a features on said outer surface portion of said rotor;
      (4) a stationary peripheral wall, said stationary peripheral wall (i) positioned radially outward from said central axis, and (ii) positioned very slightly radially outward from said outer extremity of said rotor; and (iii) having an interior surface portion;
      (5) said one or more supersonic shock compression ramps and said stationary peripheral wall cooperating to compress said gas therebetween;
      (6) one or more strakes, each of said one or more strakes provided adjacent to one of said or more supersonic compression ramps, and at least a portion of each of said one or more strakes extending outward from at least a portion of said outer surface portion of said rotor to a point adjacent said interior surface portion of said peripheral wall, and wherein said one or more strakes effectively separate said inlet gas from compressed gas downstream of each one of said supersonic gas compression ramps; and
   (b) a gas turbine section, said gas turbine section comprising
      (1) a combustor, said combustor including (i) a high pressure combustion air chamber receiving combustion air from said compressor section, (ii) a burner section receiving fuel from a fuel supply source and air from said combustion air chamber to burn said fuel and to create energetic combustion gases exiting therefrom,
      (2) one or more gas turbines, said gas turbines operatively affixed to said shaft, said gas turbines adapted to receiving hot pressurized combustion gases from said combustor and to expand said hot pressurized combustion gases outward therethrough by reacting said gases with said one ore more gas turbines, to produce shaft power;
      (3) an exhaust gas outlet, said exhaust gas outlet adapted to receive said hot pressurized combustion gases after passage through said one or more gas turbines.

2. The apparatus as set forth in claim 1, wherein each of said one or more strakes comprises a helical structure extending substantially radially from said outer surface portion of said rotor.

3. The apparatus as set forth in claim 2, wherein the number of said one or more helical strakes is N, and the number of said one or more supersonic gas compression ramps is X, and wherein N and X are equal.

4. The apparatus as set forth in claim 1 or in claim 2, wherein each of said one or more gas compression ramps comprises a outwardly sloping gas compression ramp face, said face having a base, said base located adjacent the intersection of said outwardly sloping face and said outer surface portion of said rotor.

5. The apparatus as set forth in claim 1, wherein each of said one or more gas compression ramps further comprise one or more boundary layer bleed ports.

6. The apparatus as set forth in claim 5, wherein at least one of said one or more boundary bleed ports is located at said base of said gas compression ramps.

7. The apparatus as set forth in claim 5, wherein at least one of said one or more boundary bleed ports is located on said face of said gas compression ramp.

8. The apparatus as set forth in claim 4, wherein said face and said outer surface of said rotor intersect at an angle alpha from about one degree to about fifteen degrees.

9. The apparatus as set forth in claim 1, wherein said gas compression ramps further comprise (a) a throat, and (b) an inwardly sloping gas deceleration ramp.

10. The apparatus as set forth in claim 5, wherein each of said gas compression ramps further comprise a bleed air receiving chamber, and wherein each of said bleed air receiving chambers effectively contains therein, for ejection therefrom, bleed air provided thereto.

11. The apparatus as set forth in claim 1, further comprising a high pressure combustion gas outlet throat, said outlet throat configured to receive and pass therethrough high pressure outlet gas resulting from compression of gas by said one or more gas compression ramps on said rotor.

12. The apparatus as set forth in claim 11, further comprising an inlet casing containing therein a pre-swirl impeller, said pre-swirl impeller located intermediate said gas inlet and said rotor, said pre-swirl impeller configured for compressing said inlet gas to a pressure intermediate the pressure of said inlet gas and said outlet gas.

13. The apparatus as set forth in claim 12, wherein said pre-swirl impeller is configured to provide a compression ratio of up to about 2:1.

14. The apparatus as set forth in claim 12, wherein said pre-swirl impeller is configured to provide a compression ratio between about 1.3:1 to about 2:1.

15. The apparatus as set forth in claim 12, further comprising, downstream of said pre-swirl impeller and upstream of said one or more gas compression ramps on said rotor, a plurality of inlet guide vanes, said inlet guide vanes imparting spin on gas passing therethrough so as to increase the apparent inflow velocity of gas entering said one or more gas compression ramps.

16. The apparatus as set forth in claim 15, wherein said pre-swirl impeller comprises a centrifugal compressor.

17. The apparatus as set forth in claim 16, wherein said pre-swirl impeller is mounted on a common shaft with said rotor.

18. The apparatus as set forth in claim 15, wherein the apparent velocity of gas entering said one or more gas compression ramps is in excess of Mach 1.

19. The apparatus as set forth in claim 15, wherein the apparent velocity of gas entering said one or more gas compression ramps is in excess of Mach 2.

20. The apparatus as set forth in claim 15, wherein the apparent velocity of gas entering said one or more gas compression ramps is between about Mach 1.5 and Mach 3.5.

21. The apparatus as set forth in claim 12, or in claim 20, further comprising, downstream of said pre-swirl impeller, an outlet line for intermediate pressure gas, said outlet line configured to bleed a portion of said intermediate pressure gas away from said one or more gas compression ramps.

22. The apparatus as set forth in claim 21, further comprising a gas flow regulating valve, said valve configured to vary the rate of passage of intermediate pressure gas therethrough, so as to in turn vary the amount of intermediate pressure gas entering said one or more gas compression ramps.

23. The apparatus as set forth in claim 22, where in said valve is adjustable at any preselected flow rate from (a) a closed position, wherein said valves forms a seal in said bypass line, so that as a result substantially no intermediate pressure gas escapes to said outlet line, and (b) an open position, wherein said valve allows fluid communication between said pre-swirl impeller outlet and said outlet line, or (c) a preselected position between said closed position and said open position.

24. A gas turbine power plant, comprising:
    (a) a compressor section, said compressor section comprising
        (1) a support structure, said support structure comprising (i) a circumferential housing with an inner side surface, and (ii) a gas inlet for receiving low pressure inlet gas;
        (2) a first drive shaft, said first drive shaft rotatably secured along an axis of rotation with respect to said support structure;
        (3) a first rotor, said first rotor rotatably affixed with said first output shaft for rotation with respect to said support structure, said first rotor further comprising a first circumferential portion having a first outer surface portion, said first rotor comprising one or more gas compression ramps, each one of said gas compression ramps comprising a portion integrally provided as part of said circumferential portion of said first rotor, said compressor section adapted to utilize at least a portion of said inner side surface of said first circumferential housing to compress said inlet gas thereagainst;
        (4) one or more strakes on said first rotor, wherein one of said one or more strakes on said first rotor is provided for each of said one or more gas compression ramps, and wherein each of said one or more strakes on said first rotor extends outward from at least a portion of said circumferential portion of said first rotor to a point adjacent to said inner side surface of said first circumferential housing; and
        (5) a first high pressure compressed gas outlet throat; and
    (b) a gas turbine section, said gas turbine section comprising
        (1) a combustor, said combustor including (i) a high pressure combustion air chamber receiving combustion air from said compressor section, (ii) a burner section receiving fuel from a fuel supply source and air from said combustion air chamber to burn said fuel and to create energetic combustion gases exiting therefrom, and
        (2) one or more gas turbines, said gas turbines operatively affixed to said shaft, said gas turbines adapted to receiving hot pressurized combustion gases from said combustor and to expand said hot pressurized combustion gases outward therethrough by reacting said gases with said one ore more gas turbines, to produce shaft power; and
        (3) an exhaust gas outlet, said exhaust gas outlet configured to received said hot pressurized combustion gases after passage through said one or more gas turbines.

25. The apparatus as set forth in claim 24, wherein said one or more gas turbines includes a single stage radial turbine.

26. The apparatus as set forth in claim 25, wherein said one or more gas turbines includes at least one axial turbine.

27. The apparatus as set forth in claim 25, wherein each of said one or more strakes on said first rotor and on said second rotor comprises a helical structure extending substantially radially from said outer surface portion of said first rotor or said second rotor, respectively.

28. The apparatus as set forth in claim 27, wherein the number of said one or more helical strakes on said first rotor or on said second rotor is N, and the number of said one or more supersonic gas compression ramps on said first rotor or on said second rotor is X, and wherein N and X are equal.

29. The apparatus as set forth in claim 25, wherein each of said one or more gas compression ramps comprises a outwardly sloping gas compression ramp face, said face having a base, said base located adjacent the intersection of said outwardly sloping face and said outer surface portion of said first rotor.

30. The apparatus as set forth in claim 29 wherein each of said one or more gas compression ramps further comprise one or more boundary layer bleed ports.

31. The apparatus as set forth in claim 30, wherein at least one of said one or more boundary bleed ports is located at said base of said gas compression ramps.

32. The apparatus as set forth in claim 30, wherein at least one of said one or more boundary bleed ports is located on said face of said gas compression ramp.

33. The apparatus as set forth in claim 25, wherein each of said gas compression ramps further comprise a bleed air receiving chamber, and wherein each of said bleed air receiving chambers effectively contains therein, for ejection therefrom, bleed air provided thereto.

34. The apparatus as set forth in claim 25, further comprising a first inlet casing containing therein a first pre-swirl impeller, said first pre-swirl impeller located intermediate said gas inlet and said first rotor, said first pre-swirl impeller configured for compressing said inlet gas to a pressure intermediate the pressure of said inlet gas and said outlet gas.

35. The apparatus as set forth in claim 34, wherein said first pre-swirl impeller is configured to provide a compression ratio of up to about 2:1.

36. The apparatus as set forth in claim 34, wherein said first pre-swirl impeller is configured to provide a compression ratio from about 1.3:1 to about 2:1.

37. The apparatus as set forth in claim 35, further comprising, downstream of said first pre-swirl impeller and upstream of said one or more gas compression ramps on said first rotor, a plurality of inlet guide vanes, said inlet guide vanes shaped to impart spin on gas passing therethrough so as to increase the apparent inflow velocity of gas entering said one or more gas compression ramps on said first rotor.

38. The apparatus as set forth in claim 35, wherein said first pre-swirl impellers comprises a centrifugal compressor.

39. The apparatus as set forth in claim 35, wherein said first pre-swirl impeller is mounted on a common shaft with said first rotor.

40. The apparatus as set forth in claim 35, wherein said one or more gas turbines are each mounted on a common shaft with said first rotor.

41. The apparatus as set forth in claim 25, wherein the apparent velocity of gas entering said one or more gas compression ramps is in excess of Mach 1.

42. The apparatus as set forth in claim 25, wherein the apparent velocity of gas entering said one or more gas compression ramps is in excess of Mach 2.

43. The apparatus as set forth in claim 25, wherein the apparent velocity of gas entering said one or more gas compression ramps is between about Mach 1.5 and Mach 3.5.

44. The apparatus as set forth in claim 35, further comprising, downstream of said first pre-swirl impeller, an intermediate pressure gas outlet, said intermediate pressure gas outlet configured to route a portion of said intermediate pressure gas away from said one or more compression ramps.

45. The apparatus as set forth in claim 44, further comprising downstream of said intermediate pressure gas outlet, one or more gas flow regulating valves, said valves configured to vary the rate of passage of intermediate pressure gas therethrough, so as to in turn vary the amount of intermediate pressure gas entering said one or more gas compression ramps on said first rotor.

46. The apparatus as set forth in claim 45, where in said one or more valves are adjustable at any preselected flow rate from (a) a closed position, wherein said one or more valves form a seal in said intermediate pressure gas outlet, so that as a result substantially no intermediate pressure gas escapes to said intermediate pressure gas outlet, and (b) an open position, wherein said one or more valves allows a quantity of intermediate pressure gas to escape through said intermediate pressure gas outlet, or (c) a preselected position between said closed position and said open position.

47. The apparatus as set forth in claim 1, or in claim 24, wherein said compressor section of said apparatus is configured to compress a gas comprising atmospheric air.

48. The apparatus as set forth in claim 1, or in claim 24, wherein said apparatus compresses a selected gas at an isentropic efficiency in excess of ninety (90) percent.

49. The apparatus as set forth in claim 1, or in claim 24, wherein said apparatus compresses a selected gas at an isentropic efficiency in excess of ninety (95) percent.

50. The apparatus as set forth in claim 49, wherein said compressor section operates at a non-dimensional specific speed from about 60 to about 120.

51. The apparatus of claim 1, or claim 24, wherein said rotor comprises a central disc.

52. The apparatus of claim 51, wherein said central disc is tapered, at least in part.

53. The apparatus as set forth in claim 1, or in claim 24, wherein at least a portion of said rotor is confined within a close fitting housing having a minimal distance D between said rotor and said housing, so as to minimize aerodynamic drag on said rotor.

54. A method of operating a gas turbine power plant, comprising
(a) providing a compressor section, comprising:
(1) providing one or more gas compression ramps on a rotor which is rotatably secured with respect to stationary housing having an inner surface;
(2) supplying to each of said one or more gas compression ramps an inlet gas stream;
(3) compressing said inlet gas stream between said one or more gas compression ramps and said stationary housing, to generate a high pressure gas therefrom;
(4) effectively separating inlet gas from high pressure gas by using one or more strakes along the periphery of said rotor, each of said one or more strakes provided adjacent to one of said or more gas compression ramps, and at least a portion of each of said one or more strakes extending outward from at least a portion of an outer surface portion of said rotor to a point adjacent said inner surface of said stationary housing; and
(b) providing a gas turbine section, comprising
(1) providing a combustor, said combustor including (i) a high pressure combustion air chamber receiving combustion air from said compressor section, (ii) a burner section receiving fuel from a fuel supply source and air from said combustion air chamber to burn said fuel and to create hot, pressurized, energetic combustion gases exiting therefrom, and
(2) providing one or more gas turbines, said gas turbines operatively affixed to said shaft, said gas turbines adapted to receiving said hot, pressurized, energetic combustion gases from said combustor and to expand said hot pressurized combustion gases outward therethrough by reacting said gases with said one ore more gas turbines, to produce output shaft power;
(3) driving said rotor for compression of combustion air by operatively directing a portion of said output shaft power to turn said rotor and said one or more gas compression ramps.

55. The method as recited in claim 54, wherein the apparent inlet velocity of said one or more gas compression ramps is at least Mach 2.5.

56. The method as recited in claim 54, wherein the inlet velocity of said one or more gas compression ramps is between Mach 2.5 and Mach 4.

57. The method as recited in claim 54, wherein the apparent inlet velocity of said gas compression ramps is approximately Mach 3.5.

58. The method as recited in claim 54, wherein said combustion gas comprises ambient atmospheric air.

59. The method as recited in claim 56, wherein said fuel gas is essentially natural gas.

60. The method as recited in claim 54, further comprising the step of minimizing aerodynamic drag by minimizing the number of leading edge surfaces subjected to stagnation pressure.

61. The method as recited in claim 60, wherein the number of leading edge surfaces subjected to stagnation pressure is less than five.

62. The method as recited in claim 60, wherein the number of leading edge surfaces subjected to stagnation pressure is four.

63. The method as recited in claim 54, wherein each of said one or more gas compression ramps are circumferentially spaced equally apart so as to engage said supplied gas stream substantially free of turbulence from the previous passage through a given circumferential location of any one said one or more gas compression ramps.

64. The method as recited in claim 54, wherein the cross sectional areas of each of the one or more gas compression ramps are sized and shaped to provide a desired compression ratio.

65. The method as set forth in claim 54, wherein said helical strakes are offset at a preselected angle delta, and wherein the angle of offset matches the angle of offset of each one of said one or more gas compression ramps, and wherein said angles match to allow gas entering the one or more gas compression ramps to be at approximately the same angle as the angle of offset, to minimize inlet losses.

66. The method as set forth in claim 54, further comprising, downstream of said first pre-swirl impeller, an intermediate pressure gas outlet, and wherein said method further comprises the step of bleeding a portion of gas at said intermediate pressure outward through said intermediate pressure gas outlet.

67. The method as set forth in claim 66, wherein said intermediate pressure gas outlet further comprises a bypass line having a control valve, and wherein said method comprises adjusting said control valve to a preselected flow rate from (a) a closed position, wherein said valve forms a seal in said first bypass line, so that as a result substantially no intermediate pressure gas escapes through said intermediate pressure gas outlet, and (b) an open position, wherein said valve allows intermediate pressure gas to escape said intermediate pressure gas outlet, or (c) a preselected position between said closed position and said open position.

68. The method as set forth in claim 67, wherein said bypass line routes intermediate pressure gas to mix with said combustion gases exiting from said gas turbine.

69. The method as set forth in claim 67, wherein said bypass line routes intermediate pressure gas to an atmospheric bleed outlet.

70. The method as set forth in claim 67, wherein said bypass line routes intermediate pressure gas to a compressed air supply system.

71. The method as set forth in claim 67, wherein said burner has an equivalence ratio, and wherein said equivalence ratio is maintained constant during at least a portion of the transition of said bypass valve from said closed position to said open position.

72. The method as set forth in claim 71, wherein said burner has a flame, and wherein the temperature of combustion at said flame is maintained constant during at least a portion of the transition of said bypass valve from said closed position to said open position.

73. The method as set forth in claim 71, wherein operation of said gas turbine engine at part load power is accomplished without violating lean extinction limits.

74. The method as set forth in claim 71, wherein operation of said gas turbine engine at part load power is accomplished without violating combustion stability limits.

75. The method as set forth in claim 71, wherein operation of said gas turbine engine at part load power is accomplished at NOx emission levels below about 10 ppm.

76. The method as set forth in claim 71, wherein operation of said gas turbine engine at part load power is accomplished at NOx emission levels below about 8 ppm.

77. The method as set forth in claim 71, wherein operation of said gas turbine engine at part load power is accomplished at NOx emission levels to as lows as about 6 ppm.

* * * * *